E. B. REILLY.
SUBMARINE BOAT.
APPLICATION FILED MAY 6, 1916.

1,239,723.

Patented Sept. 11, 1917.
3 SHEETS—SHEET 1.

Fig. 1.

Edward B. Reilly,
Inventor

By E. H. Bond
Attorney

E. B. REILLY.
SUBMARINE BOAT.
APPLICATION FILED MAY 6, 1916.
1,239,723.
Patented Sept. 11, 1917.
3 SHEETS—SHEET 2.
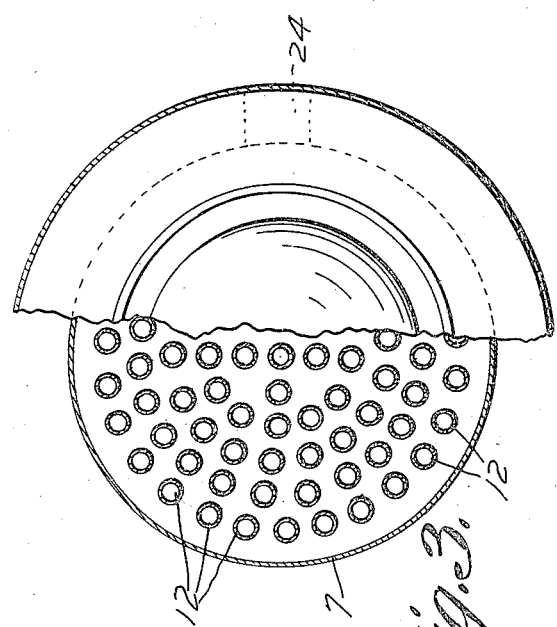
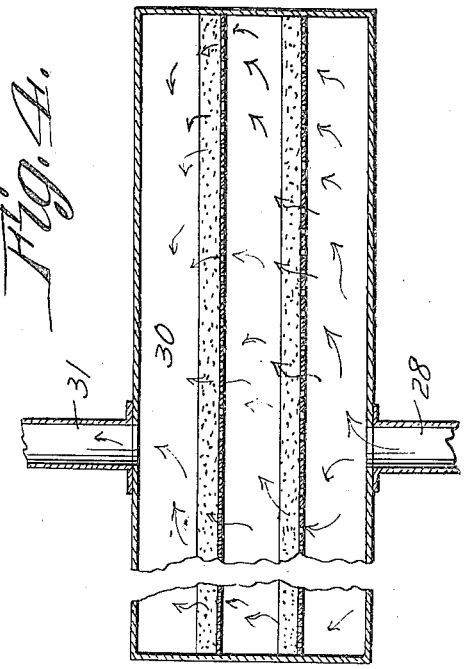
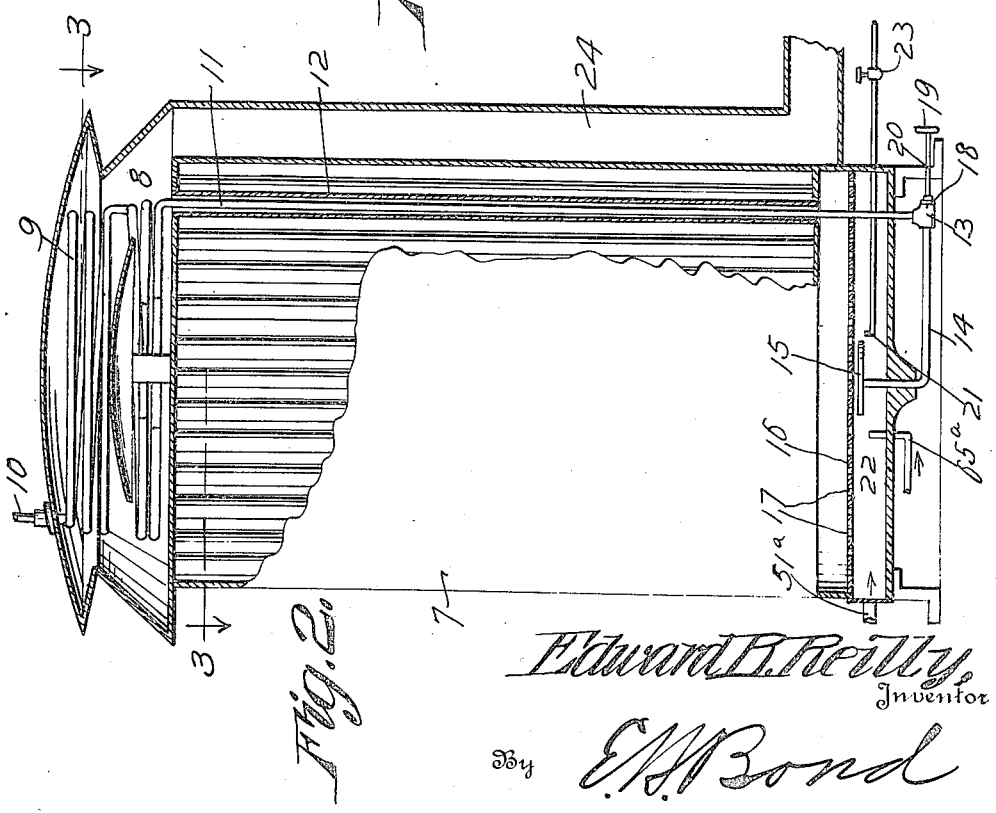

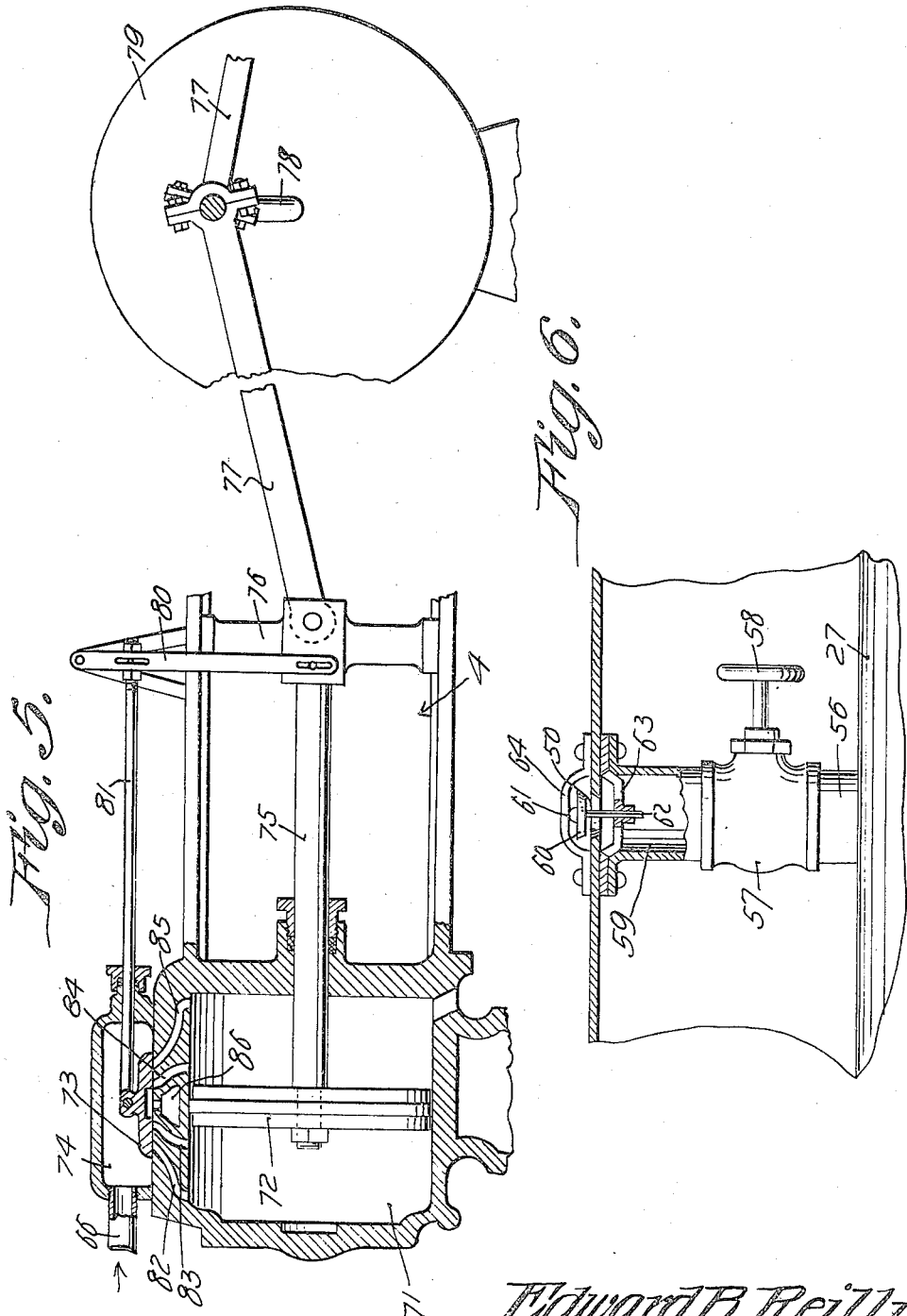

UNITED STATES PATENT OFFICE.

EDWARD B. REILLY, OF ATLANTIC CITY, NEW JERSEY, ASSIGNOR OF FOUR-FIFTHS TO HARRY R. YOUNG, OF ATLANTIC CITY, NEW JERSEY.

SUBMARINE BOAT.

1,239,723.     Specification of Letters Patent.     Patented Sept. 11, 1917.

Application filed May 6, 1916. Serial No. 95,842.

*To all whom it may concern:*

Be it known that I, EDWARD B. REILLY, a citizen of the United States, residing at Atlantic City, in the county of Atlantic and State of New Jersey, have invented certain new and useful Improvements in Submarine Boats, of which the following is a specification.

This invention relates to certain new and useful improvements in submarine boats and it has for its objects among others to provide a boat of this class in which provision is made for the separation of any necessary gas by electrolysis.

It has for a further object to provide a complete cooling or cold storage arrangement for comfort and the condensing of gases, and the storing, with pumps, tanks, condensers etc., of any gases or by-products of combustion for future use or other satisfactory disposal, and using the exhaust steam for the operation of the devices necessary to the general plan, or the saving of such exhaust steam to be later condensed back to water.

I propose to supply gases by electrolysis for combustion, the same being capable of use upon any boat, submarine or otherwise, and which will very materially reduce the consumption of oil. The fire for the boiler is run by the vaporized oils and into the fire chamber I extend two pipes, one for supplying the steam and the other leading from the electrolysis device, carrying heat-giving vapors which combine with the oil, or separately generate steam which runs the whole boat, while the products and by-products of combustion are sucked into a foul air chamber or retainer cooled by water pumped from the outside or cold storage, reducing their volume and then they are conveyed into the converter and are chemically and electrolytically worked upon by caustic soda or other suitable means and from there under high pressure in any suitable or well known manner into the condenser and saved for future use, or to be pumped overboard, as desired. While this is going on, the electrolysis device is generating all the necessary gases etc., which may be used as wanted or stored under pressure for future use; the cold storage arrangement keeps the engine cool by the water jacket and the entire interior of the boat is kept at any desired temperature automatically.

I provide for taking care of the gas fumes which may be worked upon according to conditions, with lime, caustic soda, etc., in a condenser, by first cooling and then using such chemicals as their quantities may require.

While the boat may be propelled by any suitable means, I propose to propel the same either when riding on the surface or submerged beneath the surface of the water, by the generation of steam, by burning crude oil, gasolene, coal oil or any of its refined products, or any burning fuel which can be converted into units of exertion.

The various parts may be disposed within the hull as may be found most expedient. In the present instance I have chosen to show what at the present time appears to be a very efficient and compact arrangement, but it is to be understood that the generic idea and principle of the invention will not be departed from by a different arrangement of the various elements soon to be described, or by the substitution of equivalents for any one or more of such elements.

Other objects and advantages of the invention will hereinafter appear and the novel features thereof will be particularly pointed out in the appended claims.

The invention is clearly illustrated in the accompanying drawings, which, with the numerals of reference marked thereon, form a part of this specification, and in which—

Figure 1 is a side elevation of a submarine boat equipped with my present invention, a portion being broken away and parts shown in section.

Fig. 2 is an enlarged view with a portion broken away and other parts shown in substantially central vertical section.

Fig. 3 is a horizontal section on the line 3—3 of Fig. 2, looking in the direction of the arrows.

Fig. 4 is an enlarged vertical longitudinal section through the converter.

Fig. 5 is an enlarged view partly in section and partly broken away, of the piston and slide valve of the engine.

Fig. 6 is an enlarged view, partly in elevation and partly in section, of the valve of the condenser.

Like numerals of reference indicate like parts throughout the different views.

Referring to the drawings, 1 designates the hull of the boat preferably of substantially the shape shown and having a conning tower 2 adapted to be raised or lowered by any suitable means, the same being shown as elevated in dotted lines in Fig. 1. As the means for controlling this conning tower forms no part of the present invention, no showing thereof has been made.

The boat may be propelled by any suitable means, any number of screw propellers 3 being employed and which are operated from the steam engine 4 through the usual gearing 5, the shafts of the propellers being geared in any well-known way in accordance with the number of such propellers employed.

6 is a dynamo operatively connected with the engine 4 in any suitable manner.

7 is a steam boiler of any suitable type which may be either horizontal or vertical, in the present instance being shown as vertical and having at the upper end thereof a combustion chamber 8 within which is arranged a coil 9 having connection at 10 with a source of supply of liquid fuel. From the coil 9 there extends the fuel pipe 11 which passes down through one of the tubes 12 of the boiler and having connection at 13 with the pipe 14 leading to a burner 15, or there may be a multiplicity of burners disposed beneath the plate 16 which is perforated throughout its surface, as seen at 17. A suitable valve within the chamber 18 controlled by a hand wheel or the like 19 on the stem 20 serves to govern the feed of the fuel.

A suitable pilot light 21 may be provided in the fire chamber 22 and controlled by a valve 23 and using either alcohol or gasolene for the purpose of lighting the main fire, or keeping the temperature of the water in the boiler near the steaming point.

The boiler may be of any well-known type of vertical flue or horizontal flue boiler, as may be preferred, and from the combustion chamber 8 there extends a flue 24 for conducting the products or by-products of combustion by means of pipes 26 and 28 to the bottom of a converter 30, as seen in Fig. 1, while from the top of the converter there extends a pipe 31 controlled by the valve 29, as seen best in Fig. 1. The fumes or by-products of combustion from the fire-box are drawn by means of a pump 35 through the pipe 37 which may be cooled by a cold storage system, or jacket 38ª and from thence by pipes 26 and 28 to the converter 30.

33 is the reservoir or receiver for containing the fuel supply, the flow of which through the pipe 10 to the coil 9 is controlled by a valve 34. 35 is a pump, of which 36 is the water intake pipe extending through the bottom of the hull, while 37 is a pipe extending from this pump to the bottom of the condenser and fume container 27 and provided with a controlling valve 38. 39 is a shiftable ballast container mounted to run on tracks 40 and adapted to be shifted in any suitable manner to change the center of gravity of the boat, when desired. As seen in Fig. 1, this is arranged within a chamber 41 at the longitudinal center of the boat beneath the supporting platform or deck 42 which supports the engine, the pump, the boiler and other parts, as will be readily understood upon reference to Fig. 1.

25 is a condenser from which there extends a pipe 43 leading to the hot water tank 43ª and from which extends a pipe 44 through the upper wall of the shell and provided with a controlling valve 44ª for controlling the discharge from the condenser to the atmosphere when necessary.

45ª is a pipe extending from the feed water tank 43ª for conducting the feed water into the boiler and this pipe is provided with a suitable valve 46ª.

45 is an electrolysis device connected by wire 46 with the dynamo 6 and by wire 47 with the contact point 48 with which coöperates a switch 49 connected with the dynamo, as at 50.

51 is an oxygen container connected in any suitable manner, as by the connection 52, with the electrolysis device 45, as seen in Fig. 1. 53 is the outlet from the oxygen container, said outlet being suitably controlled by a valve 54, the discharge end of the pipe 53 having a funnel-like member, 55, as seen in Fig. 1. From the container 51 there extends a pipe 51ª emptying into the fire chamber 22 for supplying oxygen for combustion to generate steam in the boiler.

56 is the outlet from the fume container 27, the same being controlled by a suitable valve, as at 57, with controlling handle 58 and leading from the valve casing of this valve is a pipe 59, see Fig. 6, which communicates with an opening 60 in the shell or hull of the vessel, this opening being controlled by the automatic valve 61 having a stem 62 guided in a spider or the like 63, a cage or the like 64 being provided, as seen in Fig. 6, to prevent outward displacement of the valve beyond predetermined limits.

65 is the exhaust pipe from the engine 4 and emptying into the condenser 25.

66 is the steam pipe from the boiler 12 to the engine 4, while 67 is a branch from the pipe 66 to the chamber 68 of the pump 35. A suitable valve 69 controls the flow through the pipe 67.

70 is the pipe for the exhaust from the chamber 68 and which connects with the main exhaust 65 from the engine 4.

From the exhaust pipe 65 from the engine there extends a branch pipe 65ª for conducting steam into the fire chamber 22 to commingle with the oxygen or hydrogen from the electrolysis device through the pipe 51ª hereinbefore described, for the purpose of aiding combustion and saving in the quantity of oil required.

From the pipe 37 leading from the pump 35, there extends a branch 37ª for supplying water to the cooling jacket 38ª which surrounds the pipe 24 through which pass the products of combustion from the boiler, 39ª is an outlet pipe from this cooling jacket adapted to extend through the hull, for the discharge of the water. By this means, the gases and by-products of combustion are cooled in their passage to the fume converter and to the fume container. The condensed steam may be conducted back to the boiler or to the water tank, as may be found most expedient.

The arrows in Fig. 1 clearly indicate the course of flow of the steam, the water and other fluids.

The steam engine employed may be of any preferred or well-known type. In Fig. 5 I have shown a detail of a portion thereof which will be found an efficient form for this purpose. Referring to said Fig. 5, 71 is the cylinder, 72 the piston, 73 the slide valve, 74 the steam chest, and 66 the steam inlet pipe hereinbefore referred to and which is connected with the boiler 12.

75 is the piston rod and 76 the crosshead. 77 is the connecting rod, 78 the crank shaft and 79 the fly wheel. 80 is the usual link motion, 81 being the rod connected therewith and operating the slide valve 73.

The cylinder is provided with ports 82, 83, 84 and 85 and the exhaust chamber 86 controlled by the valve 73 in a manner which will be readily understood.

87 is the throttle for the engine.

With the parts constructed and arranged substantially as described, the operation, briefly stated, is as follows. Steam from the boiler runs the engine; the engine runs the dynamo and the dynamo runs the lights and other necessary devices and the electrolysis device and by the electrolysis of some substance such as water, I supply the required amount of oxygen and hydrogen or any necessary gas to be used as fuel, or in the maintenance of any necessary requirements, or I separate any necessary gas or mix or liquefy or vaporize any substance or liquid or gas, for disposal within the boat, either upon the surface or below the surface of the water, or any other substance needed to be supplied, separated or disposed of. The products of combustion are conveyed from the boiler 12 through the pipe 24 through the cooling jacket 38ª and through the pipes 26 and 28 to the converter 30, outlet from which is controlled by the valve 29. Water from the sea is taken in through the pipe 36 to the pump 35 and thence through the pipe 37 to the container 27. The exhaust from the engine 4 is conducted to the condenser 25, as illustrated in Fig. 1. From the condenser 25 there extends a pipe 88 opening through the bottom of the hull and provided with a controlling valve 89. By the construction shown, I provide a complete cooling or cold storage arrangement for comfort or other purposes, and use the exhaust steam for the operation of other devices necessary to the general plan, or the saving of such exhaust steam to be later condensed back to water. I am enabled to prevent the contamination of the air by the gases which are ejected from the engine and unsuited for further use in the living compartment and thus materially lengthen the time the boat can remain submerged as well as adding to the comfort and health of the occupants.

The fumes and gases may be treated or chemically worked upon by means of lime, caustic soda, etc., in the condenser, according to existing conditions.

The construction is such that practically no care is necessary on the part of the attendant, for while in operation the parts automatically operate to perform their several functions, one following the other and depending upon another and hence ordinarily requiring but little attention.

Modifications in detail may be resorted to without departing from the spirit of the invention or sacrificing any of its advantages.

The combustible gases produced by the conversion of water or other substance by electrolysis may be used either for generating steam or may be used in the regular internal combustion type of engine in lieu of the present fuel oils etc. and to answer the same purpose.

What is claimed as new is:—

1. In a submarine boat, a normally watertight shell, propelling means embodying a steam boiler, fuel-supply means therefor, an engine, connections between said engine and boiler, and an electrolysis device operatively connected with the combustion chamber of the boiler.

2. In a submarine boat, a normally watertight shell, propelling means embodying a steam boiler, fuel-supplying means therefor, an engine, connections between said engine and boiler, an electrolysis device operatively connected with the combustion chamber of the boiler, and means for storing gases.

3. In a submarine boat, a normally watertight shell, propelling means embodying a steam boiler, fuel-supplying means therefor, an engine, connections between said engine and boiler, an electrolysis device operatively connected with the combustion chamber of the boiler, and a condenser with operative connections.

4. In a submarine boat, a normally water-tight shell, propelling means embodying a steam boiler, fuel-supplying means therefor, an engine, connections between said engine and boiler, an electrolysis device operatively connected with the combustion chamber of the boiler, a fume container, a converter and a condenser with operative connections.

5. In a submarine boat, a normally water-tight shell, propelling means embodying a steam boiler, fuel-supplying means therefor, an engine, connections between said engine and boiler, an electrolysis device operatively connected with the combustion chamber of the boiler, a fume container, a converter, a condenser with operative connections, and a water cooling system.

6. In a submarine boat having a normally water-tight shell, a steam boiler, propulsion means actuated therefrom, an electrolysis device, electrical connections with said electrolysis device controlled by said propulsion device, a fume container connected with the boiler for receiving the products of combustion therefrom, a pump connected with said container, and a condenser and a connection between the same and the pump.

7. In a submarine boat having a normally water-tight shell, a steam boiler, propulsion means actuated therefrom, an electrolysis device, and electrical connections with said electrolysis device controlled by said propulsion device, a fume container connected with the boiler for receiving the products of combustion therefrom, a pump connected with said container, a condenser and a connection between the same and the pump, and means for conducting the exhaust from the propulsion means to said condenser.

8. In a submarine boat, a steam boiler, means for supplying fuel thereto, means for supplying oxygen by electrolysis, and means for supplying such oxygen and steam to the fire chamber of the boiler for combustion, and an electrolysis device with electrical connections controlled by the propulsion device.

9. In a submarine boat, a steam boiler, a converter, means for conducting the products of combustion from said boiler to the converter, an electrolysis device and electrical connections therewith controlled by the propulsion device, and means for cooling the products of combustion in their passage, said electrolysis device being operatively connected with the combustion chamber of the boiler.

10. In a submarine boat, a steam boiler, a converter, means for conducting the products of combustion from said boiler to the converter, an electrolysis device and electrical connections therewith controlled by the propulsion device, means for cooling the products of combustion in their passage, a fume container, and means connecting said converter with said container, said electrolysis device being operatively connected with the combustion chamber of the boiler.

11. In a submarine boat, a steam boiler, means for conducting the products of combustion therefrom, a cooling jacket around said conducting means, an electrolysis device and electrical connections therewith controlled by the propulsion device, a pump and connections therewith for supplying a cooling medium to said jacket, said electrolysis device being operatively connected with the combustion chamber of the boiler.

12. In a submarine boat having a normally water-tight shell, propelling means embodying a steam boiler with a combustion chamber, means for supplying liquid fuel thereto, an engine, steam connections between said boiler and engine, an electrolysis device and means for conducting oxygen to the combustion chamber of the boiler.

13. In a submarine boat, a boiler, an engine, a dynamo, the engine constructed to run the dynamo, an electrolysis device operatively connected with said dynamo, means for supplying oxygen to the boiler and means for storing gases.

In testimony whereof I affix my signature in the presence of two witnesses.

EDWARD B. REILLY.

Witnesses:
 WM. C. FISHER,
 JESSE H. STEWART.